United States Patent [19]

Mayer

[11] Patent Number: 4,590,851

[45] Date of Patent: May 27, 1986

[54] APPARATUS FOR PROCESSING FROZEN COMESTIBLES

[75] Inventor: David Mayer, Scarsdale, N.Y.

[73] Assignee: Orange Julius International, Inc., New York, N.Y.

[21] Appl. No.: 547,331

[22] Filed: Oct. 31, 1983

[51] Int. Cl.$^4$ ............................ A23G 9/02; A23G 9/04
[52] U.S. Cl. ........................................ 99/455; 62/256; 99/452; 366/144; 366/318
[58] Field of Search ................ 99/348, 455, 452, 494, 99/460, 516, 517; 426/518, 519; 425/206–209, 151, 200, 135, 182; 366/206, 140, 142, 247, 323, 194–196, 318, 144; 222/413; 241/282.1; 62/256, 342, 404, 407, 419, 426

[56] References Cited

U.S. PATENT DOCUMENTS

| 2,332,174 | 10/1943 | Shreve | 62/256 |
| 2,421,314 | 5/1947 | Brinkoeter | 62/256 |
| 3,061,279 | 10/1962 | Reed | 425/200 |
| 4,448,114 | 5/1984 | Mayer | 366/196 |

Primary Examiner—Timothy F. Simone
Attorney, Agent, or Firm—Auslander & Thomas

[57] ABSTRACT

In an apparatus for preparing flavored frozen comestibles, the improvement comprising means for directing a stream of cold air at the surroundings of the equipment in which the product is being prepared, said air being sufficiently cold to reduce the temperature of the surroundings to about 45° F.

5 Claims, 1 Drawing Figure

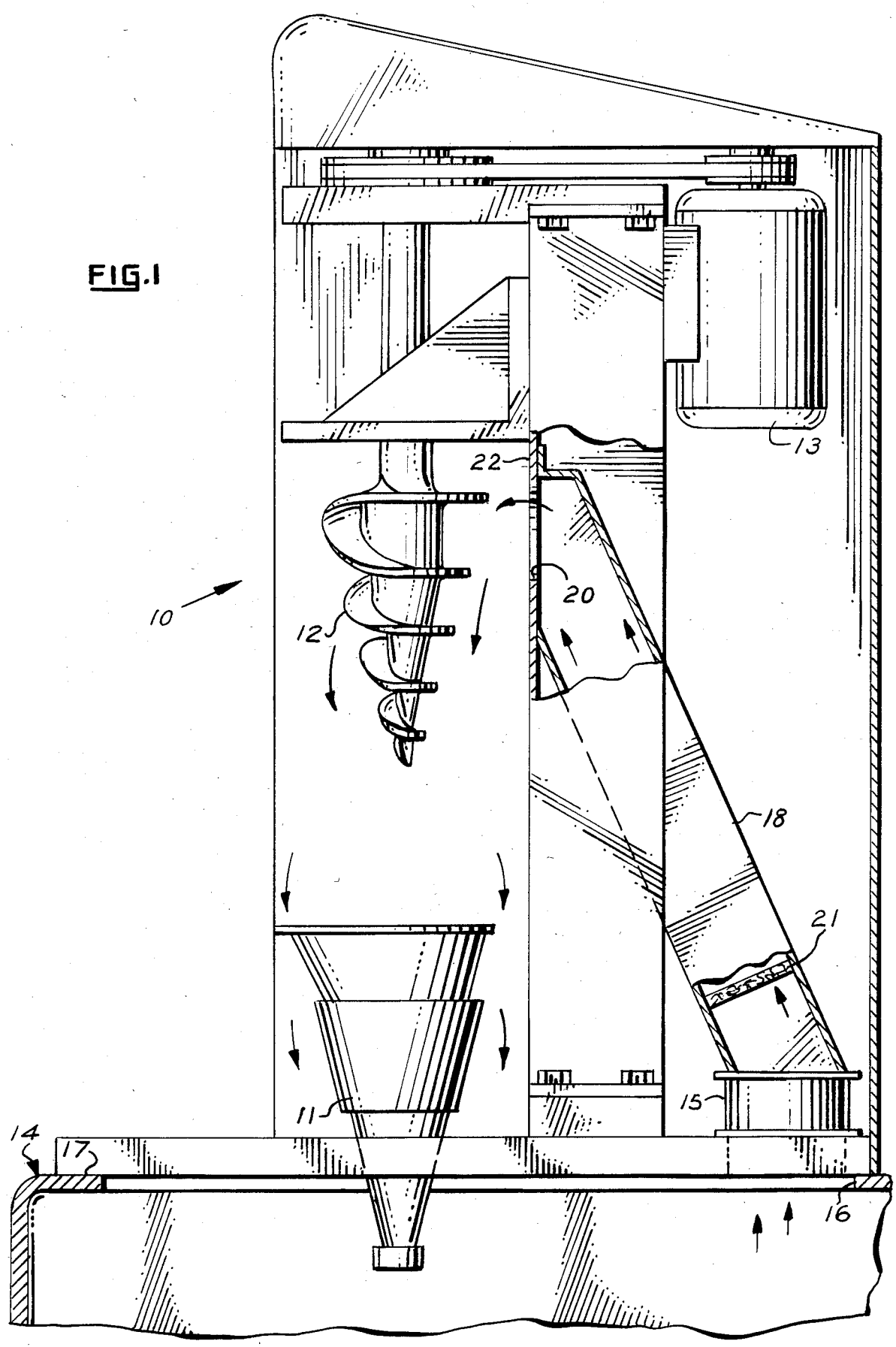

APPARATUS FOR PROCESSING FROZEN COMESTIBLES

This invention relates to an apparatus for processing frozen comestibles and in particular to an improvement therein for the temperature control during the user thereof.

BACKGROUND OF THE INVENTION

Apparatus for the processing of frozen combestibles is disclosed in several U.S. patents, particulaly U.S. Pat. Nos. 2,409,067; 2,676,132; 2,626,133; 3,061,279, as well as in U.S. Pat. No. 4,448,114, issued May 15, 1984.

Such apparatus usually has a cup for receiving a frozen comestible, rotatable auger means, means mounting the cup and auger means for relative movement toward an away from each other, and an arm for moving the auger means into and out of the cup in a first, relatively brief operation to create a pocket in the frozen comestible for the insertion therein of flavoring material, and in a second, relatively longer operation, to mix the frozen comestible and the flavoring material and extrude the mixture from the cup. The apparatus generally sits on top of a freezer chest in which are means, usually an opening in the top of the chest, in which the cup holding the frozen comestible rests. The cup with the comestible therein is raised when necessary to bring the comestible into contact with the rotating auger means.

Although the cup and comestible therein, when seated in the opening in the top of the freezer chest, are at nearly the ambient temperature of the freezer (below 32° F.), once the cup is raised out of the chest, both cup and comestible are exposed to the higher ambient temperature of the surroundings, which temperature may range from about 65° to about 72° F. Since the auger which comes into direct contact with the comestible, it also is at this higher temperature of about 65° to 72° F. This exposure to the higher ambient temperature raises the temperature of the comestible from below 32° F. depending upon the ambient temperature of the surroundings.

It is well recognized that viable micro-organisms are present in all foods, including refrigerated and frozen foods. While at low temperatures microbial growth is very slow or does not occur, it is also well recognized that at higher temperatures the growth rate increases with temperature, although the optimum growth rate will vary with different microbial species. Thus, in the preparation of flavored comestibles, the higher ambient temperature of the surroundings in which the preparation is carried out may have a deleterious effect on the product. In particular, milk and milk products which are present in these comestibles are subject to spoilage at higher temperatures because of the increase in the microbial content. Fundamentals of Microbiology, Frobisher, Hindsdill et al 9th Edition, 1974, Pp 275ff and 735ff). Furthermore, the increase in the microbial content necessitates frequent cleaning, at least every two hours, of those pieces of equipment coming into contact with the product to prevent contamination of fresh material coming into contact with the equipment. This requires a halt in the production and is time consuming and costly.

The National Santitation Foundation in Ann Arbor, Mich. in its Standard No. 6 for Dispensing Freezers, published January, 1959 and revised November, 1982, has recommended that temperatures of a mixture (such as the flavored comestible being prepared according to this invention) be kept at 45° F. to assure that the microbial count will be kept sufficiently low to avoid spoilage of the product.

DESCRIPTION OF INVENTION

It is, accordingly, an object of this invention to keep the ambient temperature of the surroundings of the equipment in which the preparation is carried out at a temperature of about 45° F.

It is another object of this invention to provide means for keeping the temperature of the surroundings at about 45° F.

It is a further object of this invention to provide means which are relatively simple to install.

In accordance with this invention, a stream of cold air is directed at the equipment in which the product is prepared, said air being sufficiently cold to keep the temperature of the surroundings and the equipment at about 45° F. To obtain this stream of cold air, there is provided in an apparatus for the preparation of flavored comestibles, a convection system through which cold air from a freezer is carried to and directed over the equipment being used to prepare the flavored comestible. The invention becomes clearer from the description which follows, taken in conjunction with the drawing which shows a preferred embodiment of the invention and is not to be considered as limiting.

DESCRIPTION OF THE DRAWING

Although such novel feature or features believed to be characteristic of the invention are pointed out in the claims, the invention and the manner in which it may be carried out, may be further understood by reference to the description following and the accompanying drawings.

FIG. 1 is a sectional view of an apparatus for preparing frozen flavored comestibles, such as that shown in FIG. 1 of U.S. Pat. No. 4,448,114, issued May 15, 1984 to which the convection system has been added. The dislcosure in said patent application is incorporated here by reference.

Referring now to the figures in greater deail, where like reference numbers denote like parts in the various figures.

Referring to the drawing, the apparatus 10, as described in U.S. Pat. No. 4,448,114, issued May 15, 1984, is provided with a steel cup 11 containing the comestible which is brought into contact with an auger 12 driven by a motor 13. The apparatus rests on top of a freezer chest 14. To keep the auger and cup when in operation at a temperature of about 45° F., cold air from the freezer chest is drawn by an exhaust fan 15 through an opening 16 in the top of the chest, and blown through duct 18 which passes through an opening in the splash shield 22. The duct 18 is so positioned that the cold air coming through its opening 20 at about the same height as the auger so the cold air flows directly at the auger. If desired, a filter 21 may be placed inside the duct 18 to catch any splash which may come through the opening 20. The filter 21 may also control or reduce the amount of dust passing through the duct. The duct is attached to the splash shield 22 which has the opening 20 by giving entry to the duct 18.

The duct 18 may be constructed of any suitable material, such as aluminum, steel, tin plate, plastic and the like. If desired, it may be insulated on the outside. The duct may be of any suitable cross-sectional shape, e.g., circular, oval, rectangular or square. The cross-sectional size may vary. For an apparatus of the type shown in U.S. Pat. No. 4,448,114, issued May 15, 1984, a duct three inches square was found to be satisfactory.

While the FIGURE shows the apparatus resting on top of a freezer chest from which cold air is drawn, it is not necessary that the cold air be drawn from this particular chest. Any source of cold air will do.

By using the cooling system of this invention, the temperature of surroundings of the auger and cup was reduced to about 45° F. when the flavored comestible was prepared. As a result of this reduced temperature and the consequent reduced growth of micro-organisms, it was not necessary to clear the equipment every two hours; a cleaning every four hours sufficed—a saving in time and costs. Furthermore, by keeping the temperature lower, the flavored comestible was firmer.

The terms and expressions which are employed are used as terms of description; it is recognized, though, that various modifications are possible.

It is also understood the following claims are intended to cover all of the generic and specific features of the invention herein described; and all statements of the scope of the invention which as a matter of language, might fall therebetween.

Having described certain forms of the invention in some detail, what is claimed is:

1. Apparatus for processing a frozen comestible said apparatus including a base; a housing; a receptacle for carrying said frozen comestible; and auger for rotatable engagement with said comestible while said comestible is carried by said receptacle; said housing adapted to be supported at its base atop an opening in a freezer chest; and opening in said base; said opening adapted to the free flow of freezer chest air about said receptacle, and air circulation means, said air circulation means including a duct and a fan, said duct open at one end to said freezer chest and at its other end opening adjacent said auger, whereby the operation of said fan circulates cold air from the freezer chest about said auger and said receptacle.

2. The invention of claim 1 wherein said cold air is sufficiently cold to reduce the temperature of said surroundings to about 45° F.

3. The invention of claim 1 wherein said duct includes an internal filter.

4. The invention of claim 2 wherein said cold air source is a freezer area.

5. The invention of claim 2 wherein said duct includes an internal filter.

* * * * *